Oct. 20, 1970     W. BECKER     3,535,052
ELECTRICALLY DRIVEN VACUUM PUMP
Filed Aug. 12, 1968     2 Sheets-Sheet 1
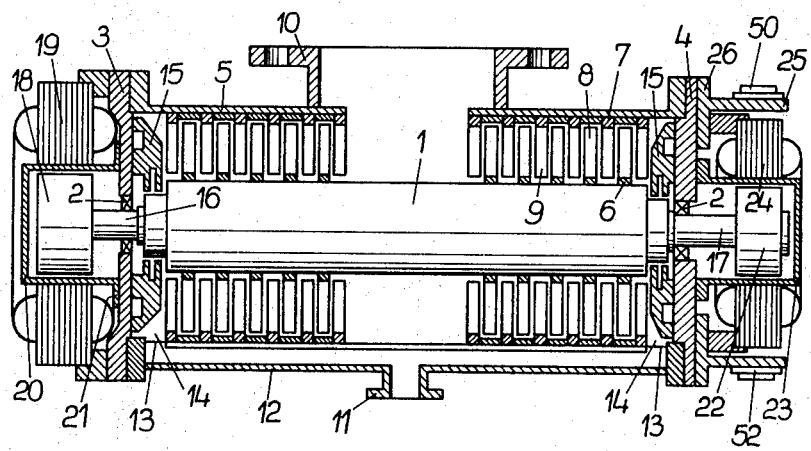
Fig. 1
Fig. 4
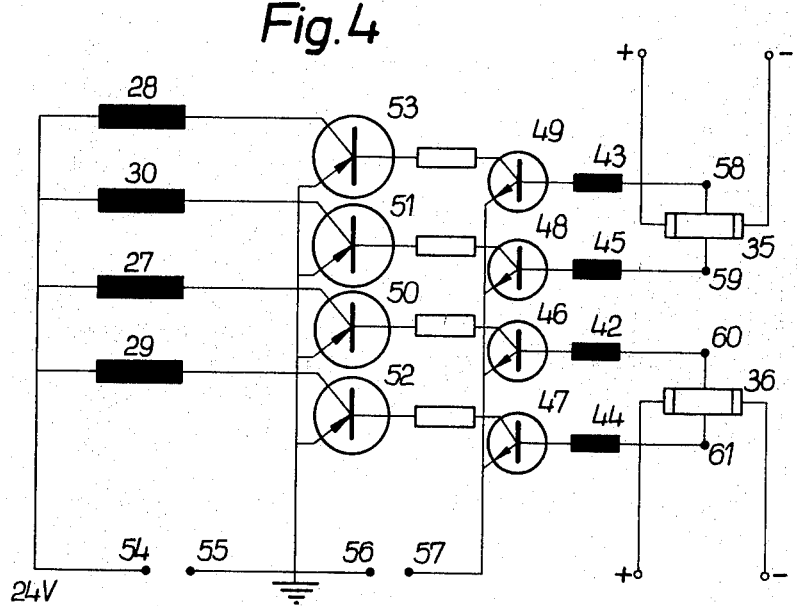
Inventor
Willi Becker
By
Watson, Cole, Grindle & Watson
Attys.

Oct. 20, 1970  W. BECKER  3,535,052
ELECTRICALLY DRIVEN VACUUM PUMP
Filed Aug. 12, 1968  2 Sheets-Sheet 2

Inventor
Willi Becker
By
Watson, Cole, Grindle & Watson
Attys.

United States Patent Office 3,535,052
Patented Oct. 20, 1970

3,535,052
ELECTRICALLY DRIVEN VACUUM PUMP
Willi Becker, Ehringshausen, Germany, assignor to Arthur Pfeiffer Hochvakuumtechnik G.m.b.H., Wetzlar, Germany, a corporation of Germany
Filed Aug. 12, 1968, Ser. No. 752,028
Claims priority, application Germany, Aug. 18, 1967, 1,628,352
Int. Cl. F04d 25/06; F04b 19/16
U.S. Cl. 417—3                                    9 Claims

ABSTRACT OF THE DISCLOSURE

A vacuum pump is driven by a direct current motor including a rotor consisting of a permanent magnet rotatable with one end of the pump shaft and a stator including windings controlled by transistors which in turn are controlled by Hall effect generators located at the opposite end of the pump shaft and through which passes the stator field of the motor.

BACKGROUND OF THE INVENTION

(1) Field of the invention

The invention relates to electrically driven vacuum pumps, particularly molecular and turbomolecular pumps, that is to say pumps which have to be driven at very high rotational speeds.

(2) Description of the prior art

The shaft of the rotating part in vacuum pumps must usually be taken through the pump housing with a vacuum-tight seal in order to enable the shaft to be coupled to the driving motor either directly or through gearing. As is well known, it is difficult for the position at which the shaft passes through the wall of the housing, usually a bearing, to be effectively sealed in a vacuum-tight manner and for this bearing to be effectively cooled at the same time. These difficulties can be avoided if the driving motor is accommodated inside the pump housing which is under vacuum. With a high vacuum however it is practically impossible for the waste heat of the rotating part of the motor to be discharged from the housing.

SUMMARY

It is possible for the driving motor to be installed in the pump housing if in accordance with the present invention the rotating pump part is driven by means of a commutator-less direct current motor the rotating part of which, that is to say the rotor, consists of a permanent magnet. A magnet of this kind requires no cooling. This magnet can be fastened on the pump shaft and either enclosed by itself in a vacuum-tight cylindrical housing part which is in communication with the housing of the vacuum pump, the magnetic field of the permanent magnet then passing through this part, or the entire motor is accommodated in the pump housing, because the waste heat of the stator can easily be discharged in known manner. The use of a direct current motor as driving motor for vacuum pumps also provides the great advantage that it can be driven at very high speeds, for example 15,000 to 30,000 revolutions per minute or more.

In vacuum pumps of the kind concerned, that is to say particularly in turbomolecular pumps, starting causes special difficulties. During operation, that is to say at full speed and corresponding vacuum, turbomolecular pumps require very low power. Only relatively small driving motors are therefore required for operation. With a motor of this kind however the pump cannot be brought up to its operating speed within an acceptable period of time, that is to say the power of the motors must generally be made considerably greater than required for operation. The starting time then still amounts to several minutes if a corresponding vacuum is simultaneously produced by a prevacuum pump. Hitherto it has been customary for the electric driving motor or a gear train inserted between the motor and the pump shaft to be coupled to the latter by means of a slip coupling, in order to enable the pump to be run up to its operating speed within an acceptable period of time with the aid of a relatively small driving motor.

When a commutator-less direct current motor is used in which the necessary current reversal is effected in the windings of the stationary stator with the air of transistors, which in turn are controlled by Hall effect generators, the transistors limit the power of the motor while the pump is running up to operating speed. During operation the power loss in the transistors is only small, since in the stator windings of the motor the rotating permanent magnet induces a counter-voltage which is approximately equal to the mains voltage applied, that is to say only the different voltage goes to the transistors. Since in addition the power required for driving the vacuum pump during operation is very low and corresponds approximately to the bearing friction losses of the pump, the current is also low, that is to say the transistors previously available are entirely adequate for operation. When the motor or pump is started up, an approximately equal voltage opposite to the voltage of the main is not yet produced, that is to say the control voltage of the transistor must be selected to be so low that the product of the voltage and armature voltage of the main is restricted to a value such as not to exceed the permissible power loss of the transistor. The armature current during the starting-up of the pump is thus restricted to the value of the mains current during operation, that is to say the running-up time of the pump becomes impermissibly long. These difficulties are obviated by the invention.

To this end, according to another feature of the invention, the control voltage of the transistors is raised by a voltage increasing proportionally with the speed of the motor and therefore of the pump. This means that with increasing speed the motor current increases, but the power loss of the transistors remains the same. Instead of remaining constant, the resulting acceleration moment increases with the speed of rotation, so that the time required for the pump to run up to operating speed can be restricted to the time of a few minutes as was previously customary.

As mentioned, the transistors are controlled by Hall effect generators, in which an alternating voltage the amplitude of which is limited is generated on the rotation of the rotor. In carrying the invention into effect control windings are connected in series with the Hall effect generators and are disposed either in the stator of the commutator-less direct current motor or in a second, likewise commutator-less generator, so that they produce alternating current voltages which are synchronous with the alternating current voltages of the Hall effect generators, while their magnitude is proportional to the speed of the direct current motor. The sum of the alternating current voltage of a Hall effect generator and that of a control winding is then in each case fed to the individual transistors, with the effect that the appertaining transistor allows an increasing current to pass to the stator windings of the driving motor, that is to say the acceleration moment of the motor increases with increasing speed, without the power loss in the transistors being increased.

When the driving motor reaches a speed which corresponds approximately to its operating speed, a counter-voltage is produced in the stator windings of the commutator-less motor, as in any direct current motor, this counter-voltage being approximately equal to the operating voltage. With decreasing difference between these two voltages, however, the armature current decreases, that is to say the motor cannot exceed its operating speed. The voltage in the control windings is thus also limited to a determined value. The current absorption of the motor during operation then no longer depends on the control voltage of the transistor or of the Hall effect generators, but on the torque which is required at each moment by the pump, and which, as mentioned, is low and corresponds substantially to the friction losses of the bearings in the pump.

When the greater fluctuations of the mains voltage feeding the motor have to be expected during operation, greater increases in voltage may lead to an impermissible increase of the pump speed. In order to prevent this, the voltage of the motor may be fed to the transistors or to their pre-transistors through Zener diodes in such a manner that the speed of the motor is kept constant even when the mains voltage rises.

BRIEF DESCRIPTION OF THE DRAWINGS

FIG. 1 is a diagrammatic longitudinal section through a turbo-molecular vacuum pump, according to the invention.

DESCRIPTION OF THE PREFERRED EMBODIMENT

Figure 2:
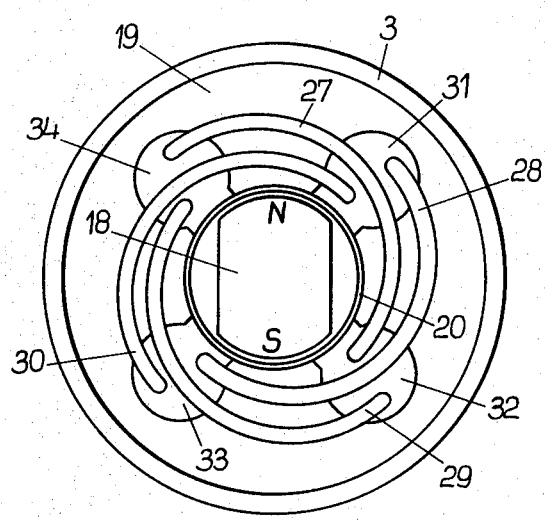
FIG. 2 is a diagrammatic end view of the rotor and the stator of a direct current electric driving motor embodied in the pump.

The turbomolecular pump illustrated in FIG. 1 is known as such, and is therefore illustrated only diagrammatically. Its rotating part consists of a shaft 1, which, by means of bearings 2, is mounted in the end walls 3 and 4 of the pump housing 5. The end walls 3, 4 are bolted to the flanges of the cylindrical housing 5 of the pump. A plurality of discs 6 are mounted on the shaft 1 and are arranged in two groups equispaced from the mid-position along the length of the shaft 1. Between the discs 6, which rotate with the shaft 1, stationary annular discs 7 are disposed in the housing 5. The rotating discs 6 and the stationary discs 7 have specially shaped grooves 8 and 9 respectively near their outer periphery. A stationary disc 7 and a rotating disc 6 form in each case a pressure stage of the pump. The suction connection of the pump is indicated by the reference 10 and is connected to a container or to a chamber, not shown, to be evacuated. The outlet connection is indicated by the reference 11 and is connected in the usual manner to a prevacuum pump, not shown. The connection 11 is provided on a tube 12, which is in communication with the pressure chambers 14 of the pump through apertures 13. The reference 15 indicates water cooled plates which prevent the formation of oil vapours on the bearings 2.

As shown in the drawings the shaft 1 is provided with coaxial journals 16 and 17 extending from the opposite ends of the shaft. The rotor 18 of a direct current electric driving motor consists of a permanent magnet and is mounted on the journal 16. The stator laminations of the motor are designated 19. The rotor 18 is surrounded by a cap-like hood 20, the flange 21 of which is connected in a vacuum-tight manner to the end wall 3. The cylindrical wall of the hood 20, which is preferably made of electrically insulating material, lies in the air gap between the rotor 18 and the stator laminations 19, which are fastened on the end wall 3.

The stator laminations 19 together with their windings are situated outside the pump housing 5, that is to say outside the vacuum, so that the stator can be cooled by any usual means. It is, however, possible for the entire motor to be enclosed in a hood which is fastened on the end wall 3. The motor may, however, if desired, be accommodated inside a lengthened pump housing 5, so that the end wall 3 with the bearing 2 lies to the left of the motor. This arrangement has the advantage that the bearings 2 are accessible from outside, that is to say they are easier to service. In this case the stator may advantageously be cooled by water cooling. The rotor 22 of a control generator also consists of a permanent magnet and is fastened on the journal 17. The rotor 22 is enclosed by a hood 23. The stator 24 is surrounded by an octagonal ring 25 which is fastened by a flange 26 on the end wall 4 and carries the stator 24. As will be described below, transistors which serve to control the windings of the driving motor 18, 19, illustrated in FIG. 2, are mounted on the ring 25.

Figure 3:
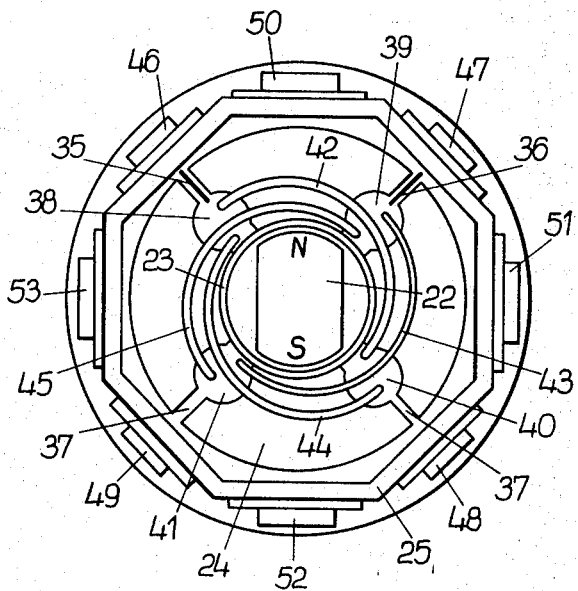
FIG. 3 is a diagrammatic view of a generator for generating the control voltages, and FIG. 4 a diagrammatic circuit diagram of the control of the direct current motor.

In FIG. 2 the stator laminations 19 are illustrated diagrammatically. The laminations carry four working windings 27 to 30, which are accommodated in the usual manner in slots in the stack of laminations. For the sake of simplicity only four slots 31 to 34 are illustrated. The windings 27 and 29 on the one hand and the windings 28 and 30 on the other hand cooperate together. The windings are in the form of diameter windings, that is to say conductors of the windings 27, 29 and 28, 30 respectively lie in each slot. When the same current passes through both windings, their magnetic effects are cancelled. The control described below for the currents in the aforesaid working windings 27 to 30 is so arranged that all windings carry the same current, and therefore cancel the magnetic effect one of the other, and that on the intervention of the control the current in one of the two associated windings, for example the winding 27, decreases, that is to say goes back to zero, while the current in the other winding, that is to say 29, increases, so that together with the magneic field of the rotor 18 a torque is formed. The current in the windings is controlled in known manner by means of transistors, which in turn are controlled by Hall effect generators. These Hall effect generators, which are designated by 35 and 36, are accommodated in the stator laminations 24 of the control generator, as illustrated in FIG. 3. The laminations 24 are illustrated as consisting of four equal parts, which are separated from one another by air gaps 37. In two of these air gaps there are disposed Hall effect generators 35 and 36 which are offset by 90° in relation to one another, since the machine in question is of the two-pole type. The stator laminations again form diagrammatically four slots 38 to 41, in which four control windings 42 to 45 are accommodated, that is to say windings in which additional control voltages are produced which are in series with the voltages of the Hall effect generators 35 and 36.

Four auxiliary pretransistors 46 to 49 and four main transistors 50 to 53 are disposed on the ring 25.

The method of operation of the driving motor and of the control generator can be seen from the circuit diagram shown in FIG. 4. As FIG. 4 shows, the four working windings 27 to 30 are in parallel to the terminals 54, 55. Each winding is controlled by one of the main transistors 50 to 53. The main transistors 50 to 53 receive their control voltage through auxiliary transistors 46 to 49 from the terminals 56, 57 of an auxiliary voltage. The auxiliary transistors 46 to 49 are controlled by the two Hall effect generators 35 and 36. The Hall effect generators are connected in the customary manner to a direct current voltage. The voltage generated in the Hall effect generator is applied between the terminals 58, 59 and 60, 61 respectively. Each of the terminals mentioned is in series with one of the control windings 42 to 45. As long as there is no voltage between the terminals 58, 59 and 60, 61 respectively, the circuit is arranged so that the main transistors 50 to 53 allow a predetermined, equal current to flow through all four windings 27 to 30. An alternating current voltage is produced in each Hall effect generator when the rotor rotates. The voltages of the two Hall effect generators are displaced in phase by 90° in relation to one another. When for example the voltage produced is positive in the terminal 58, the transistor 49 and thus also the main transistor 53 are adjusted in the upward direction, while the transistor 48 and the main transistor 51 are adjusted in the downward direction, that is to say the current in the winding 28 increases and that in the winding 30 decreases. The same applies to the transistors 46, 47 and 50, 52. In the control windings 43 and 45 alternating current voltages are produced which are in phase with the voltage of the Hall effect generator 35 but are oppositely directed to one another, and similarly in the control windings 42 and 44 there are produced alternating current voltages which are in phase with the voltage of the Hall effect generator 36 and oppositely directed to one another. The voltages of the control windings are therefore added to the voltage of the appertaining Hall effect generator and effect increased adjustment in the upward direction or downward direction of the auxiliary transistors 46 to 49.

I claim:

1. An electrically driven vacuum pump, as a turbomolecular pump, comprising a commutator-less direct current motor to drive the pumps and having a rotor consisting of a permanent magnet, a stator for the motor, working windings disposed on the stator, and main transistors mounted on the stator and which, in turn, are controlled by a Hall effect control generator through which passes said stator field of the motor.

2. A vacuum pump according to claim 1 in which controls are provided arranged to feed to the main transistors additional control voltages which are in phase with the voltage of the appertaining Hall effect generator and the magnitude of which is proportional to the speed of rotation of the motor.

3. A vacuum pump according to claim 1 in which auxiliary transistors preceding the main transistors are provided and control windings arranged to feed to the auxiliary transistors additional control voltages which are in phase with the voltage of the appertaining Hall effect generator and the magnitude of which is proportional to the speed of rotation of the motor.

4. A vacuum pump according to claim 2, in which the Hall effect generators and the control windings are accommodated in a control generator having a rotor consisting of a permanent magnet and a stator similar to that of the motor.

5. A vacuum pump according to claim 3, in which the Hall effect generators and the control windings are accommodated in a control generator having a rotor consisting of a permanent magnet and a stator similar to that of the motor.

6. A vacuum pump according to claim 1, in which the driving motor is disposed on one side and the Hall effect generators on the other side of the pump.

7. A vacuum pump according to claim 6, in which journals are provided extending from the opposite side of the pump shaft and the rotors of the motor and of the Hall effect generators are rotatable with the journals and are enclosed by substantially cylindrical caps connected in a vacuum-tight manner to the pump housing.

8. A vacuum pump according to claim 7, wherein the stator of the Hall effect generators is surrounded by a polygonal casing which has good heat conducting connection to a cooled end wall of the pump housing, and that the main and auxiliary transistors are disposed on the outer side of the polygonal casing.

9. A vacuum pump according to claim 1, in which the driving motor and Hall effect control generators are disposed inside the pump housing.

References Cited

UNITED STATES PATENTS

| | | | |
|---|---|---|---|
| 3,168,977 | 2/1965 | Garnier et al. | 230—117 |
| 3,189,264 | 6/1965 | Becker | 230—118 XR |

ROBERT M. WALKER, Primary Examiner

U.S. Cl. X.R.

417—44